(12) United States Patent
Miyamoto et al.

(10) Patent No.: US 7,347,700 B2
(45) Date of Patent: Mar. 25, 2008

(54) ELECTRONIC APPARATUS CAPABLE OF MOUNTING A PLURALITY OF MODULES

(75) Inventors: Tomofumi Miyamoto, Tokyo (JP); Koichiro Takeguchi, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/359,197

(22) Filed: Feb. 21, 2006

(65) Prior Publication Data

US 2006/0205246 A1 Sep. 14, 2006

(30) Foreign Application Priority Data

Mar. 9, 2005 (JP) .......................... P2005-065888

(51) Int. Cl.
*H01R 12/00* (2006.01)
(52) U.S. Cl. ...................................... 439/68
(58) Field of Classification Search .................. 439/68, 439/69, 70, 65; 710/301, 315; 361/686, 361/785
See application file for complete search history.

(56) References Cited

U.S. PATENT DOCUMENTS

| | | | | |
|---|---|---|---|---|
| 6,288,908 B1 * | 9/2001 | Saitoh | ........................ | 361/785 |
| 6,295,565 B1 * | 9/2001 | Lee | ............................ | 710/301 |
| 6,527,562 B2 * | 3/2003 | Tanaka et al. | ................ | 439/65 |
| 7,018,242 B2 * | 3/2006 | Brown et al. | ............... | 439/676 |
| 7,099,152 B2 * | 8/2006 | Gasbarro et al. | ........... | 361/686 |
| 7,112,082 B2 * | 9/2006 | Tsai | ........................... | 439/329 |
| 2006/0015673 A1 * | 1/2006 | Morrow | ..................... | 710/315 |

FOREIGN PATENT DOCUMENTS

| | | |
|---|---|---|
| JP | 2003029872 | 1/2003 |
| JP | 2004-165552 | 6/2004 |
| TW | M252087 | 12/2004 |

OTHER PUBLICATIONS

English Translation of first Office Action for Patent Office of the People's Republic of China (including description of TW Patent No. M252087), Appln. No. 2006100588339, mailed Sep. 28, 2007.

* cited by examiner

*Primary Examiner*—Chandrika Prasad
(74) *Attorney, Agent, or Firm*—Blakely, Sokoloff, Taylor & Zafman (57) ABSTRACT

According to one embodiment, an electronic apparatus includes: a casing; a circuit board provided in the casing; a connector mounted to the circuit board and detachably connecting a first module; and a first storing portion positioned between the first module and the circuit board when the first module is connected to the connector, for storing a second module.

20 Claims, 6 Drawing Sheets

ELECTRONIC APPARATUS CAPABLE OF MOUNTING A PLURALITY OF MODULES

CROSS-REFERENCE TO RELATED APPLICATIONS

This application is based upon and claims the benefit of priority from Japanese Patent Application No. 2005-065888, filed Mar. 9, 2005, the entire contents of which are incorporated herein by reference.

BACKGROUND

1. Field

One embodiment of the invention relates to an electronic apparatus in which a plurality of modules can be mounted, and, more particularly, to a structure of electronic apparatus in which a plurality of modules are mounted at high density, so that the apparatus is miniaturized in overall size.

2. Description of the Related Art

A variety of modules are mounted in an electronic apparatus, such as a portable computer, in accordance with use. Examples of modules to be mounted include a PCI (peripheral component interconnect) module for carrying out data communications by way of a LAN (local area network), or the like. The PCI module referred to here means a module to be connected to a PCI bus.

Other examples of the module to be mounted include memory cards, such as an SD (secure digital memory) card (Registered trademark), a memory stick (Registered trademark), and a CF (compact flash) card (Registered trademark). A card-housing section for reading and writing data from and to such a memory card is attached in a portable computer.

A portable computer has a module-housing section inside a casing, for allowing these modules to be mounted. In some cases, a plurality of modules; e.g., a PCI module and a memory card, are mounted in the module-housing section. In such a case, the plurality of modules are mounted side by side in the module-housing section.

More specifically, a connector, a card-housing section, and the like, which correspond to the respective modules, are attached in the module-housing section side by side and coplanar. As a result, when mounted in the module-housing section, the respective modules are mounted side by side (see, e.g., Japanese Patent Application Publication (KOKAI) No. 2004-165552 (lower right column, fourth paragraph, FIGS. 4 and 5)).

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described below in detail with reference to the drawings. In general, according to one embodiment of the invention, an electronic apparatus includes: a casing; a circuit board provided in the casing; a connector mounted to the circuit board and detachably connecting a first module; and a first storing portion positioned between the first module and the circuit board when the first module is connected to the connector, for storing a second module.

Figure 1:
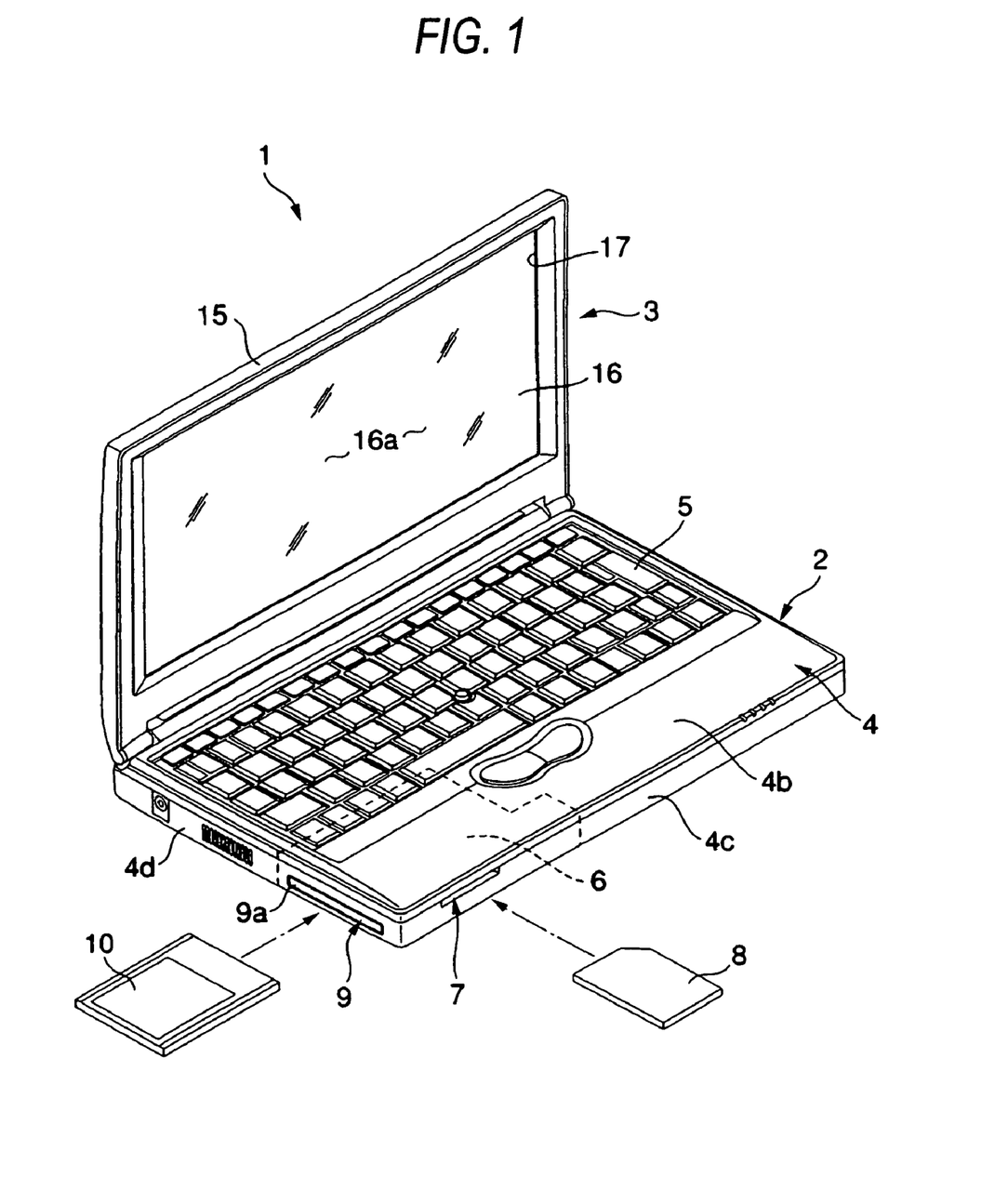
FIG. 1 is an exemplary perspective view of a portable computer according to a first embodiment of the invention.

FIGS. 1 through 4 show a portable computer 1 serving as an electronic apparatus according to a first embodiment of the present invention. As illustrated in FIG. 1, the portable computer 1 has a main body 2 and a display unit 3.

The main body 2 has a box-like casing 4. The casing 4 has a bottom wall 4a, an upper wall 4b, a front wall 4c, a right side wall 4d, a left side wall (not shown), and a rear wall (not shown). The upper wall 4b of the casing 4 supports a keyboard 5.

A module-housing section 6 is incorporated inside the casing 4, at a right front corner thereof. The front wall 4c of the casing 4 has a first opening 7. The first opening 7 is open to the front of the casing 4. The first opening 7 is an insertion port through which, e.g., a memory card, such as an SD card (Registered trademark) 8 serving as a second module, is inserted into the module-housing section 6. The right side wall 4d of the casing 4 has a second opening 9. The second opening 9 is open to the right of the casing 4. The second opening 9 is an insertion port through which, e.g., a PC card 10 serving as a third module, is inserted into the module-housing section 6. The second opening 9 is covered with a reclosable lid 9a.

The display unit 3 has a display housing 15, and a liquid crystal display panel 16 housed in the display housing 15. The liquid crystal display panel 16 has a display screen 16a. The display screen 16a is exposed to the outside of the display housing 15 through an opening 17 formed in a front face of the display housing 15.

The display housing 15 is supported on the casing 4 at the rear end thereof by way of an unillustrated hinge unit. By virtue of this configuration, the display unit 3 can pivot between a closed position and an open position. In the closed position, the display unit 3 is folded so as to cover the upper wall 4b and the keyboard 5 from above. In the open position, the display unit 3 stands upright so as to expose the upper wall 4b, the keyboard 5, and the display screen 16a.

Figure 2:
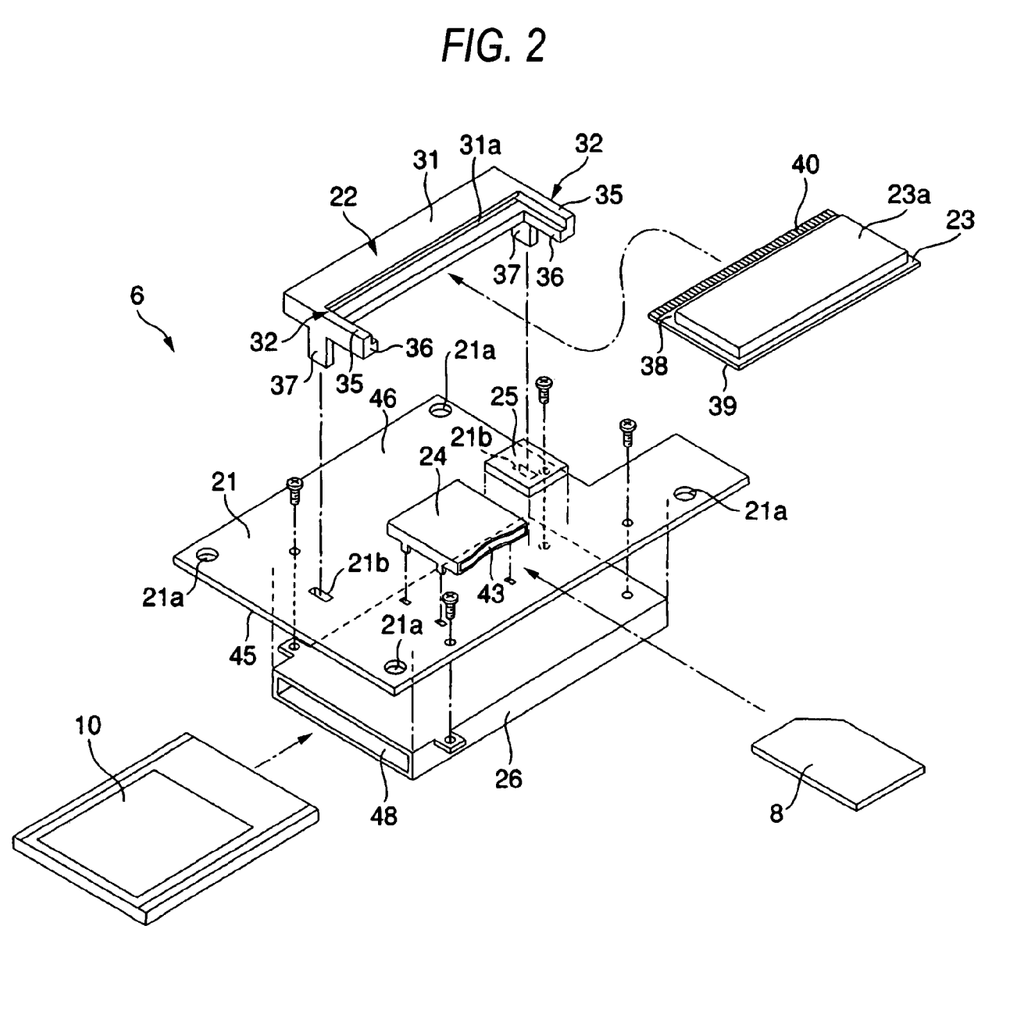
FIG. 2 is an exemplary exploded perspective view of a module-housing section of the portable computer illustrated in FIG. 1.

FIG. 2 shows the module-housing section 6. The module-housing section 6 has a circuit board 21, a connector 22, a W-LAN (wireless LAN) module 23 serving as the first module, an SD card slot 24 serving as a storing portion for storing the second module, a controller 25, and a PC card slot 26 serving as a storing portion for storing the third module.

The circuit board 21 is substantially rectangular, and has a hole 21a in each of its four corners. A screw, or the like, is inserted through the hole 21a, whereby the circuit board 21 is fixed to an unillustrated printed circuit disposed inside the casing 4. Through this fixation, the circuit board 21 is connected to printed wiring, thereby receiving signals and power supply by way of the printed wiring.

The circuit board 21 has an unillustrated conductor pattern. The conductor pattern is electrically connected to constituent elements, such as the connector 22, the SD card slot 24, the controller 25, and the PC card slot 26. Signal transmission and power supply to the respective constituent elements 22, 24, 25, and 26 are carried out by way of the conductor pattern.

The circuit board 21 has two mounting holes 21b by way of which the connector 22 is mounted. The two mounting holes 21b are disposed in essentially center positions on the circuit board 21 in the direction of the shorter sides thereof while being spaced apart from each other an interval essentially equal to the width of the connector 22 in the direction of the longer sides of the same.

The connector 22 has a slot section 31, and a pair of support sections 32 disposed on two opposite longitudinal ends of the slot section 31. A PCI slot 31a which is open toward the front of the casing 4 is provided in the front face of the slot section 31. The PCI slot 31a is a bus conforming to the PCI standard.

The slot section 31 has unillustrated wiring which electrically connects between the PCI slot 31a and the circuit board 21 when the connector 22 is attached to the circuit board 21.

The support sections 32 are formed so as to project to the front of the casing 4 from the two opposite longitudinal ends of the slot section 31. Each of the support sections 32 has a side wall 35, a bottom wall 36, and a foot section 37. The side walls 35 extend to the front of the casing 4 from the two opposite longitudinal ends of the slot section 31. Each of the bottom walls 36 horizontally extends toward the other support section 32 from the side wall 35. Each of the foot sections 37 projects downward from a lower face of a substantially center of the side wall 35.

The foot sections 37 are fit into the mounting holes 21b of the circuit board 21, thereby attaching the connector 22 to the circuit board 21. Since the support sections 32 have the foot sections 37, attachment of the connector 22 to the circuit board 21 brings the support sections 32 into a state where the bottom walls 36 of the support sections 32 are apart from the circuit board 21 by a distance corresponding to the length of the foot sections 37.

The W-LAN module 23 is detachably connected to the connector 22. The W-LAN module 23 is an example of a PCI module to be connected to a PCI bus.

The W-LAN module 23 of the present embodiment has a first face 38 on which a component 23a is mounted, a second face 39 on which no component is mounted, and a terminal section 40. The terminal section 40 is located on a front end of the W-LAN module 23, and has a connection terminal conforming to the PCI standard.

Furthermore, the W-LAN module 23 is a so-called half-size PCI module whose length in the depth direction is about half of that of a regular W-LAN module.

The W-LAN module 23 is connected to the connector 22 by means of inserting the terminal section 40 into the slot 31a, as well as placing the second face 39 on the bottom walls 36 of the support sections 32. As a result, the W-LAN module 23 is supported on the connector 22 such that the second face 39 faces to the circuit board 21.

Figure 4:
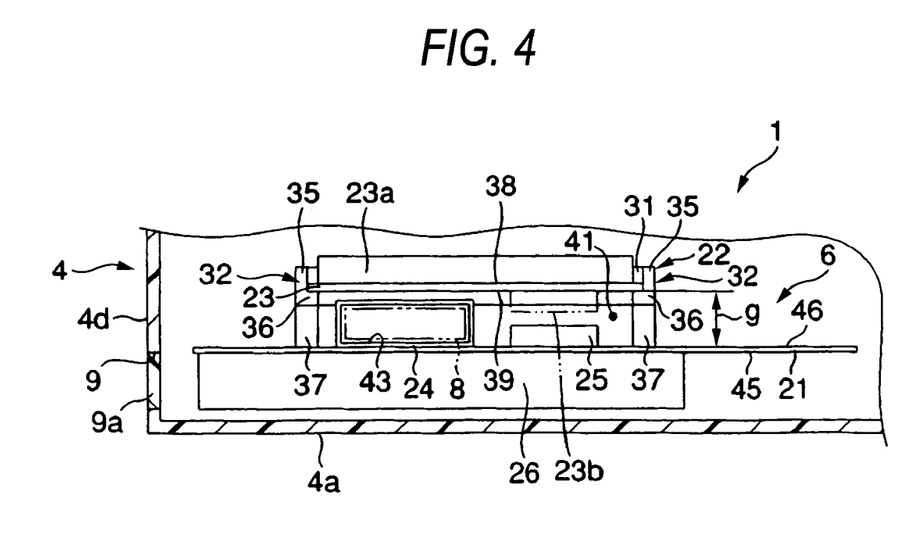
FIG. 4 is an exemplary front view of the module-housing section illustrated in FIG. 3.

In relation to the above, the bottom walls 36 of the support sections 32 are apart from the circuit board 21. Accordingly, as illustrated in FIG. 4, the W-LAN module 23 is located so as to have a gap "g" from the circuit board 21.

Figure 3:
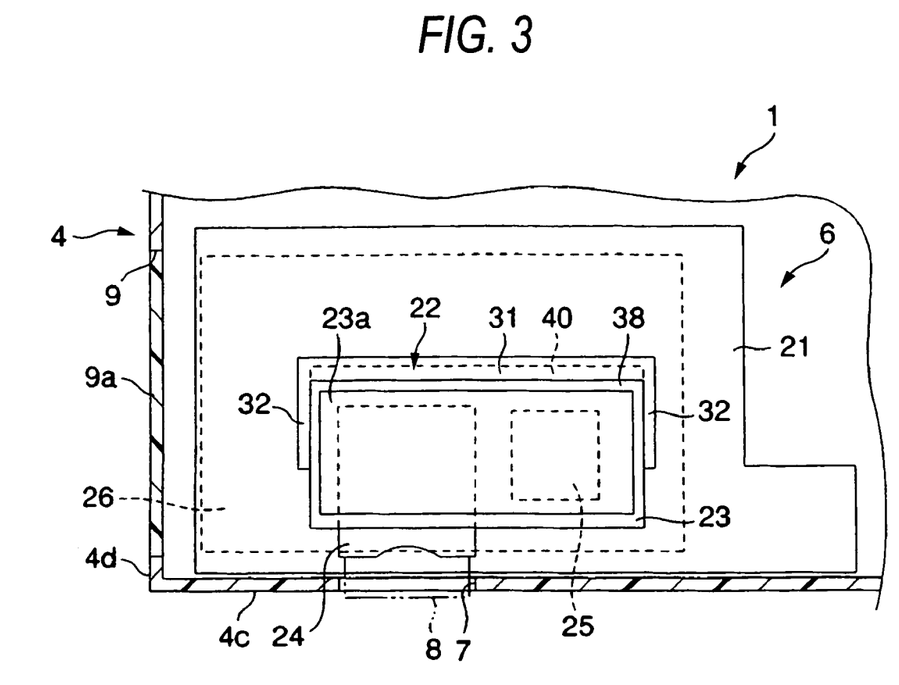
FIG. 3 is an exemplary plan view of a module-housing section according to the first embodiment of the invention.

A space provided between an upper face of the circuit board 21 and the second face 39 of the W-LAN module 23 defines a housing space 41. The controller 25 and the SD card slot 24 are disposed side by side in the housing space 41. Put another way, the controller 25 and the SD card slot 24 are disposed between the circuit board 21 and the W-LAN module 23. The SD card slot 24 is an example card-storing portion for storing a module having a card shape.

The SD card slot 24 detachably accommodates the SD card (Registered trademark) 8 serving as the second module. The SD card slot 24 is mounted on the circuit board 21 so as to be positioned in a right-side portion of the housing space 41. The SD card slot 24 has an insertion port 43 which is open toward the front wall 4c of the casing 4. The insertion port 43 is positioned to the rear of the first opening 7. By virtue of this configuration, a user can insert the SD card (Registered trademark) 8 through the first opening 7 into the insertion port 43 of the SD card slot 24.

The controller 25 is mounted on the circuit board 21 so as to be positioned adjacent to and to the left of the SD card slot 24. The controller 25 is a control device for controlling the SD card (Registered trademark) 8 accommodated in the SD card slot 24, and the PC card 10 accommodated in the PC card slot 26.

Meanwhile, the PC card slot 26 is attached to a lower face 45 of the circuit board 21; put another way, on the face opposite a face 46 where the W-LAN module 23 is located. The PC card slot 26 detachably accommodates the PC card 10.

The PC card slot 26 is positioned so as to vertically overlap with the W-LAN module 23 and the connector 22, with the circuit board 21 therebetween. The PC card slot 26 vertically overlapping with the W-LAN module 23 means that the PC card slot 26 also vertically overlaps with the SD card slot 24.

More specifically, when the SD card (Registered trademark) 8 and the PC card 10 are respectively inserted into the SD card slot 24 and the PC card slot 26 in a state where the W-LAN module 23 is attached to the connector 23, the W-LAN module 23, the SD card (Registered trademark) 8, and the PC card 10 are positioned so as to be vertically overlap.

The PC card slot 26 has an insertion port 48 which is open toward the right side wall 4d of the casing 4. More specifically, the insertion port 48 of the PC card slot 26 is open at a phase of 90° in relation to the direction along which the insertion port 43 of the SD card slot 24 is open.

The insertion port 48 of the PC card slot 26 is located to the back of the second opening 9 formed in the right side wall 4d of the casing 4. By virtue of this configuration, a user can insert the PC card 10 through the second opening 9 into the insertion port 48 of the PC card slot 26.

According to the portable computer having the above configuration, the SD card slot 24 is disposed between the circuit board 21 and the W-LAN module 23, and the W-LAN module 23 and the SD card slot 24 vertically overlap with the circuit board 21.

Therefore, in a state where the SD card (Registered trademark) 8 is attached in the SD card slot 24, the foot print occupied by two modules consisting of, e.g., the W-LAN module 23 and the SD card (Registered trademark) 8, can be substantially reduced so as to be equal to a footprint occupied only by the W-LAN module 23. As a result, a plurality of modules can be mounted inside the casing 4 at high density, thereby miniaturizing the portable computer 1.

In addition, the W-LAN module 23 according to the present embodiment has the first face 38 on which the component 23a is mounted, and the second face 39 on which no component is mounted. By means of disposing the second face 39 so as to oppose the circuit board 21, the gap "g" from the circuit board 21 can be ensured without disposing the W-LAN module 23 at a position significantly apart from the circuit board 21.

More specifically, even when the W-LAN module 23 and the SD card (Registered trademark) 8 are positioned in a vertically-overlapping manner, the mount height can be made smaller than that in the case where a regular W-LAN module and the SD card (Registered trademark) 8 are mounted while vertically overlapping each other. As a result, a plurality of modules can be mounted at still higher density, which is advantageous in terms of further miniaturization of the portable computer 1.

Furthermore, the W-LAN module 23 of the present embodiment is a so-called half-size PCI module whose length in the depth direction is about of half that of a related-art W-LAN module. Therefore, the mounting area of the W-LAN module 23 can be made smaller than that of a regular W-LAN module.

In addition, the PC card slot 26 is positioned so as to vertically overlap with the W-LAN module 23 and the connector 22. More specifically, as viewed from the normal line direction of a circuit board surface of the circuit board 21, a region where the W-LAN module 23, the connector 22, and the SD card slot 24 are disposed is entirely within a region where the PC card slot 26 is disposed. Put another way, all the constituent elements within the module-housing section 6 are mounted within the mounting area of the PC card 10. Therefore, the configuration of the present embodiment is advantageous for miniaturization of the portable computer 1 also in this respect.

Furthermore, the connector 22 and the controller 25 are positioned while vertically overlapping with the circuit board 21. Accordingly, terminal sections of the connector 22 and the controller 25 are disposed closer to each other than in the case where the same are disposed side by side and coplanar. In the present embodiment, both the connector 22 and the controller 25 are connected to a PCI bus. Hence, by virtue of the arrangement where the terminals of the connector 22 and the controller 25 are disposed close to each other, a conductor pattern formed on the circuit board 21 can be simplified, thereby attaining further reduction of the mounting area.

According to the present embodiment, the SD card (Registered trademark) 8, the PC card 10, and the controller 25 for controlling the cards are disposed close to each other. These components are connected by way of the conductor pattern of the circuit board 21. Accordingly, the conductor pattern can be simplified, thereby enabling further reduction of the mounting area.

The insertion port 48 of the PC card slot 26 is open at an angle of 900 in relation to the direction along which the insertion port 43 of the SD card slot 24 is open. By virtue of this configuration, when the module-housing section 6 is disposed inside the casing 4 at a right front portion thereof, the two insertion ports 43 and 48 can be independently disposed in the front wall 4c and the side wall 4d. More specifically, the module-housing section 6 can be disposed in corner portions of the casing 4.

The present embodiment employs the W-LAN module 23 having the first face 38 on which the component 23a is mounted, and the second face 39 on which no component is mounted. However, as indicated by a line constituted of long and short dashes in FIG. 4, as another example, there can be employed a W-LAN module in which a component 23b which is smaller in mount height than the component 23a mounted on the first face is mounted on the second face.

Also in this case, the mount height can be made smaller than in the case where a regular W-LAN module and a regular SD card (Registered trademark) are mounted while vertically overlapping each other, thereby yielding an effect similar to that yielded by the present embodiment.

Meanwhile, as a matter of course, the first module to be supported by the connector 22 is not limited to a W-LAN module, and an arbitrary PCI module connectable to a PCI bus may be employed. Furthermore, the first module is not limited to a PCI module, and another type of module may be employed.

In the present embodiment, the controller 25 is a controller for controlling the SD card (Registered trademark) 8 serving as the second module. However, the controller to be mounted in the housing space 41 is not limited thereto. For instance, the controller may be a controller for controlling the first module; alternatively, may be a controller for controlling both the first and second modules.

Furthermore, the present embodiment employs the SD card (Registered trademark) as the second module. However, the second module is not limited thereto. An arbitrary module can be employed as the second module, so long as the module is of a size which can be accommodated under the first module.

Figure 5:
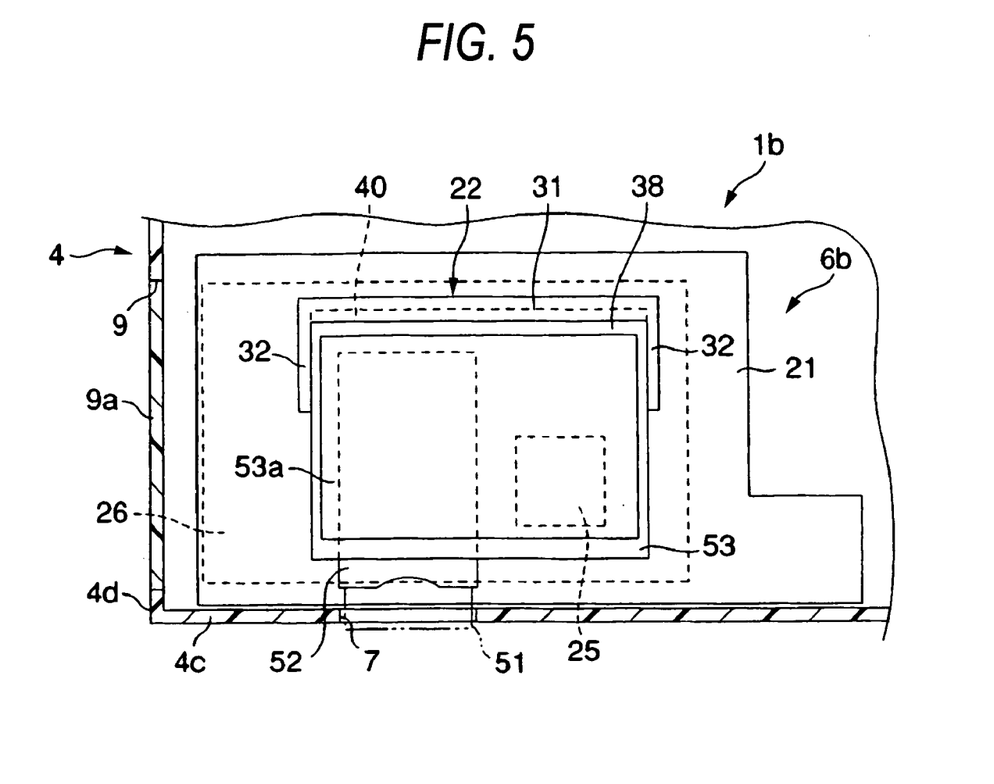
FIG. 5 is am exemplary plan view of a module-housing section according to a second embodiment of the invention.
Figure 6:
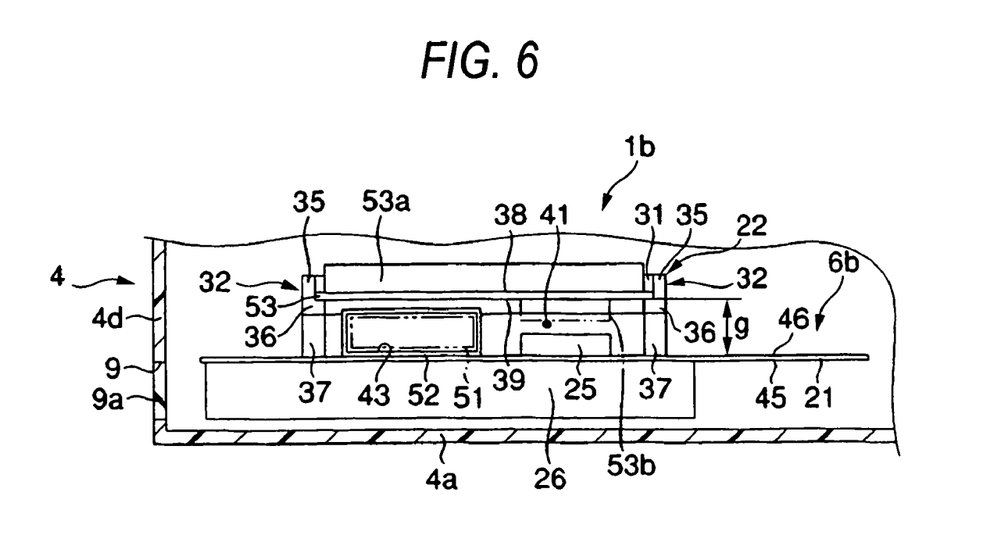
FIG. 6 is an exemplary front view of the module-housing section illustrated in FIG. 5.

Next, a portable computer 1b serving as an electronic apparatus according to a second embodiment of the invention will be described by reference to FIGS. 5 and 6. Meanwhile, constituent elements having the same functions as those of the portable computer 1 according to the first embodiment are denoted by the same reference numerals, and repeated descriptions are omitted. The portable computer 1b according to the present embodiment has a memory stick slot 52 for detachably accommodating a memory stick (Registered trademark) 51 serving as a second module, in place of the SD card slot 24.

A module-housing section 6b located inside the casing 4 has the circuit board 21, the connector 22, a W-LAN module 53 serving as a first module, the memory stick slot 52 serving as a storing portion for storing the second module, the controller 25, and the PC card slot 26 serving as a storing portion for storing the third module.

The W-LAN module 53 of the present embodiment is a so-called standard-size W-LAN module whose length in the depth direction is about the same as that of a regular W-LAN module. The W-LAN module 53 is an example of a PCI module.

Similar to the W-LAN module 23 according to the first embodiment, the W-LAN module 53 of the present embodiment has the first face 38 on which a component 53a is mounted, the second face 39 on which no component is mounted, and the terminal section 40.

The W-LAN module 53 is detachably connected to the connector 22. The W-LAN module 53 is connected to the connector 22 by means of inserting the terminal section 40 into the slot 31a, as well as placing the second face 39 on the bottom walls 36 of the support sections 32. As a result, the W-LAN module 53 is supported on the connector 22 such that the second face 39 opposes the circuit board 21.

A space provided between an upper face of the circuit board 21 and the second face 39 of the W-LAN module 53 defines the housing space 41. The controller 25 and the memory stick slot 52 are disposed side by side in the housing space 41. The memory stick slot 52 is an example card-storing portion for storing a module having a card shape.

The memory stick slot 52 is mounted on the circuit board 21 so as to be positioned in a right-side portion of the housing space 41. The memory stick slot 52 has the insertion port 43 which is open toward the front wall 4c of the casing 4. The insertion port 43 is positioned to the rear of the first opening 7. By virtue of this configuration, a user can insert the memory stick (Registered trademark) 51 through the first opening 7 into the insertion port 43 of the memory stick slot 52.

The controller 25 is mounted on the circuit board 21 so as to be positioned immediately to the left of the memory stick slot 52. The controller 25 is a control device for controlling the memory stick (Registered trademark) 51 accommodated in the memory stick slot 52 and the PC card 10 accommodated in the PC card slot 26.

According to the portable computer 1b having the above configuration, the memory stick slot 52 is disposed between the circuit board 21 and the W-LAN module 53. More specifically, the W-LAN module 53 and the memory stick slot 52 are positioned while vertically overlapping with the circuit board 21.

Therefore, in a state where the memory stick (Registered trademark) 51 is attached in the memory stick slot 52, the mounting areas of two modules constituted of, e.g., the W-LAN module 53 and the memory stick (Registered trademark) 51, can be substantially reduced so as to be a mounting area as small as that of only the W-LAN module 53. As a result, a plurality of modules can be mounted inside the casing 4 at high density, thereby obtaining the portable computer 1b which is miniaturized.

The W-LAN module 53 of the present embodiment is a standard PCI module whose length in the depth direction is about the same as that of a regular W-LAN module. Therefore, a portable computer in which a widely used PCI module is incorporated can be reduced in size.

Furthermore, since the W-LAN module 53 is a standard PCI module, the housing space 41 is provided with a larger depth dimension than that in the case where a half-size PCI module is employed. Accordingly, the second module to be mounted in the housing space 41 can be selected from a wider range.

The W-LAN module 53 according to the present embodiment is a W-LAN module having the first face 38 on which the component 53a is mounted, and the second face 39 on which no component is mounted. By means of disposing the second face 39 so as to oppose the circuit board 21, the gap "g" between the W-LAN module 53 and the circuit board 21 can be ensured without disposing the W-LAN module 53 at a position significantly apart from the circuit board 21.

More specifically, even when the W-LAN module 53 and the memory stick (Registered trademark) 51 are positioned while vertically overlapping each other, the mount height can be made smaller than that in the case where a regular W-LAN module and a regular memory stick (Registered trademark) are mounted while vertically overlapping each other.

According to the present embodiment, the memory stick (Registered trademark) 51, the PC card 10, and the controller 25 for controlling the stick and the card are disposed close to each other. These components are connected by way of the conductor pattern of the circuit board 21. Accordingly, the conductor pattern can be simplified, thereby attaining further reduction of the mounting area.

Meanwhile, the present embodiment employs the W-LAN module 53 having the first face 38 on which the component 53a is mounted and the second face 39 on which no component is mounted. However, as indicated by a line constituted of long and short dashes in FIG. 6, as another example, there can be employed a W-LAN module in which a component 53b which is smaller in height than the component 53a mounted on the first face is mounted on the second face.

Meanwhile, as a matter of course, the first module to be supported by the connector 22 is not limited to a W-LAN module, and an arbitrary PCI module connectable to a PCI bus may be employed. Furthermore, the first module is not limited to a PCI module, and may be another type of module.

A memory stick (Registered trademark) is employed as the second module. However, as a matter of course, the second module is not limited thereto, and, e.g., a SD card (Registered trademark) may be employed.

In addition, a so-called combo slot or a so-called 3-in-1 slot, which can accommodate a plurality of types of modules, may be employed as a housing section for housing the second module, thereby accommodating a plurality of types of modules, such as an SD card (Registered trademark), a memory stick (Registered trademark), and a CF card (Registered trademark).

The controller 25 of the present embodiment is a controller for controlling the memory stick (Registered trademark) 51 serving as the second module. However, the controller to be mounted in the housing space 41 is not limited thereto. For instance, the controller may be a controller for controlling the first module; alternatively, the controller may be a controller for controlling both the first and second modules.

Figure 7:
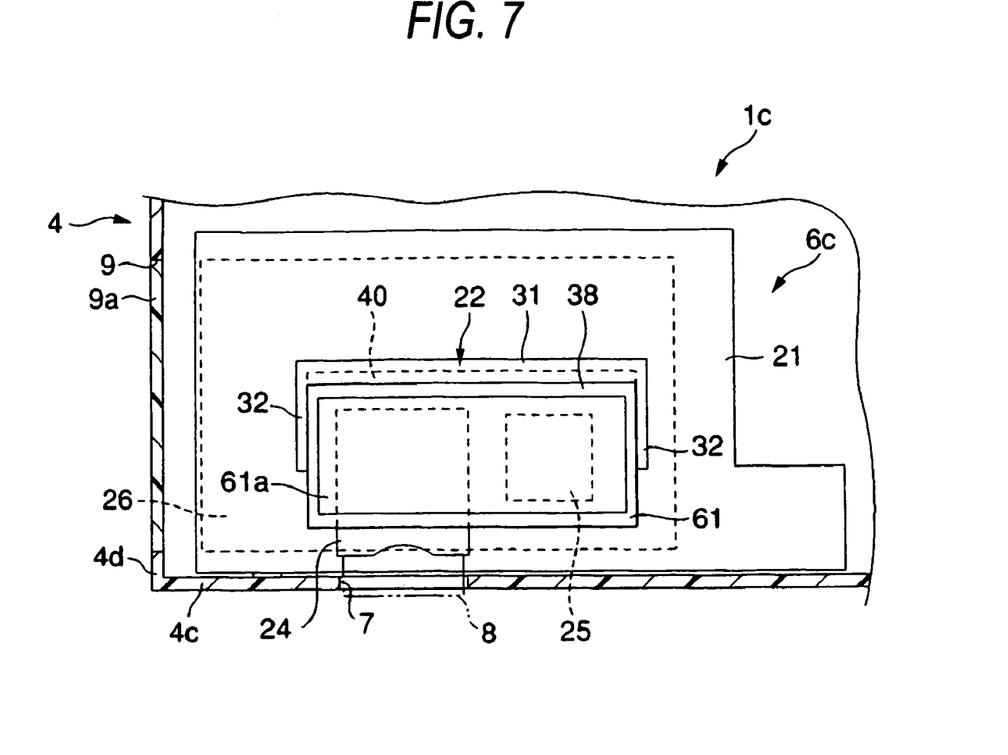
FIG. 7 is an exemplary plan view of a module-housing section according to a third embodiment of the invention.
Figure 8:
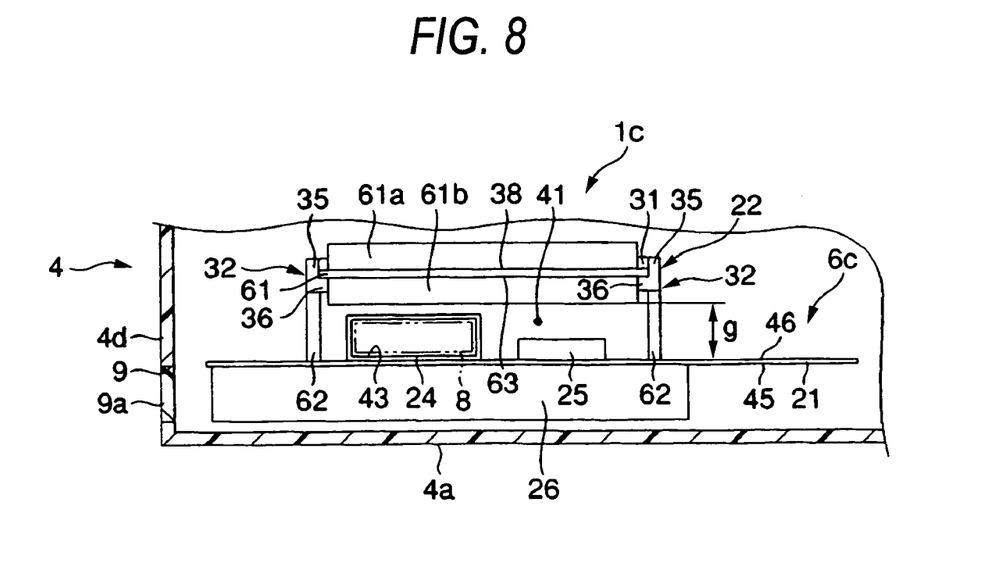
FIG. 8 is an exemplary front view of the module-housing section illustrated in FIG. 7.

Next, a portable computer 1c serving as an electronic apparatus according to a third embodiment of the invention will be described by reference to FIGS. 7 and 8. Meanwhile, constituent elements having the same functions as those of the portable computer 1 according to the first embodiment are denoted by the same reference numerals, and repeated descriptions are omitted. The portable computer 1c according to the present embodiment has a W-LAN module 61 on a surface of which a component 61a is mounted, and on a back surface of which a component 61b is mounted.

A module-housing section 6c located inside the casing 4 comprises the circuit board 21, the connector 22, the W-LAN module 61 serving as a first module, the SD card slot 24 serving as a storing portion for storing the second module, the controller 25, and the PC card slot 26 serving as a storing portion for storing the third module.

The support sections 32 of the connector 22 have the side walls 35, the bottom walls 36, and a pair of foot sections 62. Each of the foot sections 62 projects downward from a lower face of a substantially center of the side wall 35. The foot section 62 is larger in height than the foot section 37 according to the first embodiment, by the height of the component 61b mounted on the back surface of the W-LAN module 61. The foot sections 62 are fit in the mounting holes 21b of the circuit board 21, thereby attaching the connector 22 to the circuit board 21.

The W-LAN module 61 has the first face 38 on which the component 61a is mounted, the second face 63 on which the component 61b is mounted, and the terminal section 40. The W-LAN module 61 is an example of a PCI module.

The W-LAN module 61 is a so-called half-size PCI module whose length in the depth direction is about half of that of a regular W-LAN module.

The W-LAN module 61 is connected to the connector 22 by means of inserting the terminal section 40 into the slot 31*a* as well as placing the second face 63 on the bottom walls 36 of the support sections 32.

In relation to the above, the bottom walls 36 of the support sections 32 are apart from the circuit board 21. Each of the foot sections 62 is formed so as to be longer in the vertical direction than the foot section 37 according to the first embodiment. As a result, the W-LAN module 61 is located with a gap "g" from the circuit board 21.

A space provided between an upper face of the circuit board 21 and the second face 63 of the W-LAN module 61 defines the housing space 41. The controller 25 and the SD card slot 24 are disposed side by side in the housing space 41.

According to the portable computer 1*c* having the above configuration, the SD card slot 24 is disposed between the circuit board 21 and the W-LAN module 61. More specifically, the W-LAN module 61 and the SD card slot 24 are positioned while vertically overlapping with the circuit board 21.

Therefore, in a state where the SD card (Registered trademark) 8 is attached in the SD card slot 24, the mounting areas of two modules constituted of, e.g., the W-LAN module 61 and the SD card (Registered trademark) 8, can be substantially reduced so as to be a mounting area as small as that of only the W-LAN module 61. Therefore, a plurality of modules can be mounted inside the casing 4 at high density, thereby obtaining the portable computer 1*c* which is miniaturized.

The W-LAN module 61 according to the present embodiment is a general-purpose PCI module on a surface of which the component 61*a* is mounted, and on a back surface of which the component 61*b* is mounted. Therefore, a portable computer in which a widely used PCI module is incorporated can be reduced in size.

Meanwhile, the first module to be supported by the connector 22 is not limited to the W-LAN module 61 of a so-called half size, and may be a so-called standard-size W-LAN as in the case of the W-LAN module 53 according to the second embodiment.

Furthermore, the component 61*b* to be mounted on the W-LAN module 61 of the present embodiment has the same mount height as that of the component 61*a*. However, the component 61*b* is not limited thereto. For instance, there may be employed a component which is smaller in mount height than the component 61*a*. In this case, the length of foot sections of the connector 22 can be reduced, thereby enabling mounting of a plurality of modules at higher density.

Furthermore, as a matter of course, the first module is not limited to a W-LAN module, and an arbitrary PCI module connectable to a PCI bus may be employed. Furthermore, the first module is not limited to a PCI module, and may be another type of module.

According to the present embodiment, the controller 25 is a controller for controlling the SD card (Registered trademark) 8. However, the controller to be mounted in the housing space 41 is not limited thereto. For instance, the controller may be a controller for controlling the first module; alternatively, may be a controller for controlling both the first and second modules.

The present embodiment employs the SD card (Registered trademark) as the second module. However, the second module is not limited thereto. An arbitrary module can be employed as the second module, so long as it is of a size which can be accommodated under the first module.

Figure 9:
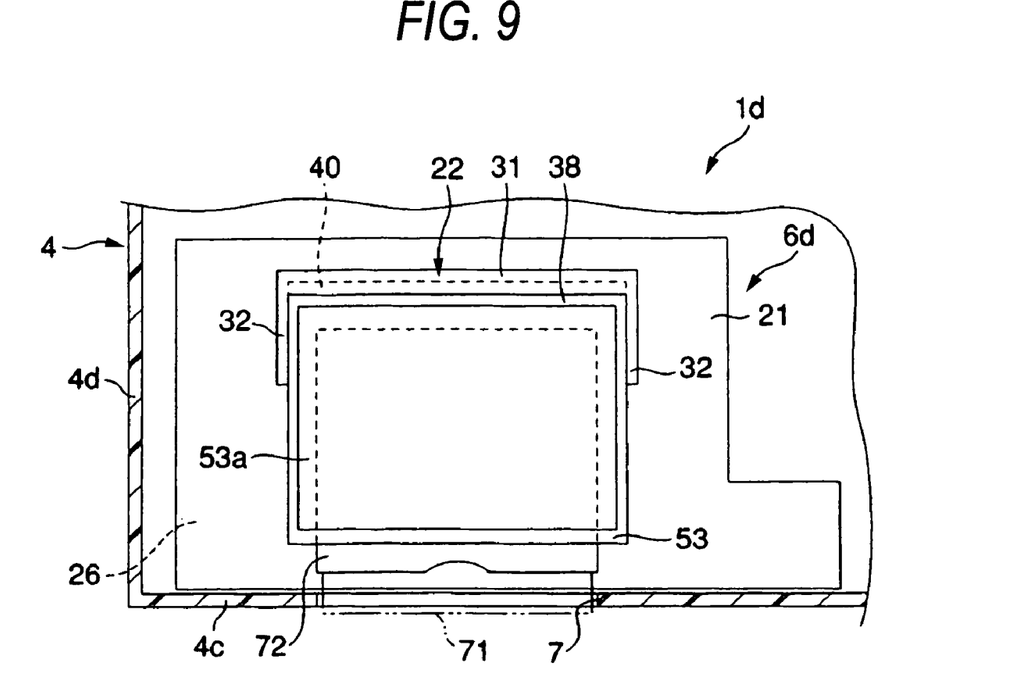
FIG. 9 is an exemplary plan view of a module-housing section according to a fourth embodiment of the invention.
Figure 10:
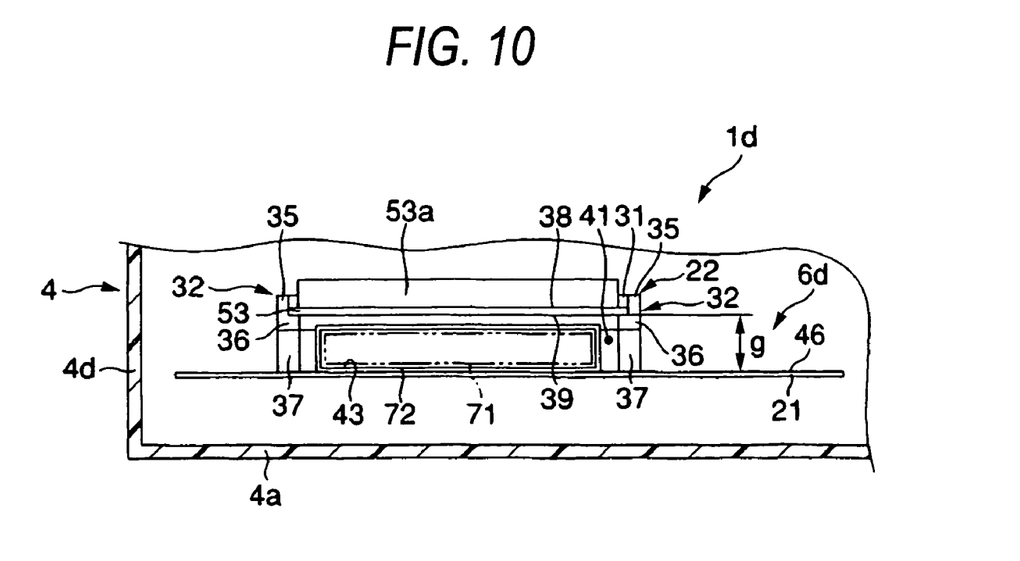
FIG. 10 is an exemplary front view of the module-housing section illustrated in FIG. 9.

Next, a portable computer 1*d* serving as an electronic apparatus according to a fourth embodiment of the invention will be described by reference to FIGS. 9 and 10. Meanwhile, constituent elements having the same functions as those of the portable computer 1 according to the first embodiment are denoted by the same reference numerals, and repeated descriptions are omitted. The portable computer 1*d* according to the present embodiment has a CF card slot 72 for detachably accommodating a CF card (Registered trademark) 71 serving as a second module, in place of the SD card slot.

A module-housing section 6*d* located inside the casing 4 has the circuit board 21, the W-LAN module 53 serving as a first module, the connector 22, and the CF card slot 72 serving as a storing portion for storing the second module.

A space provided between an upper face of the circuit board 21 and the second face 39 of the W-LAN module 53 defines the housing section 41. The CF card slot 72 is disposed in the housing section 41. The CF card slot 72 is an example card-storing portion for storing a module having a card shape.

The CF card slot 72 is mounted on the circuit board 21. The CF card slot 72 has the insertion port 43 which is open toward the front wall 4*c* of the casing 4. The insertion port 43 is positioned to the rear of the first opening 7. By virtue of this configuration, a user can insert the CF card (Registered trademark) 71 through the first opening 7 into the insertion port 43 of the CF card slot 72.

According to the portable computer 1*d* having the above configuration, the CF card slot 72 is disposed between the circuit board 21 and the W-LAN module 53. More specifically, the W-LAN module 53 and the CF card slot 72 are positioned while vertically overlapping with the circuit board 21.

Therefore, in a state where the CF card (Registered trademark) 71 is attached in the CF card slot 72, the mounting areas of two modules constituted of, e.g., the W-LAN module 53 and the CF card (Registered trademark) 71, can be substantially reduced so as to be a mounting area as small as that of only the W-LAN module 53. As a result, a plurality of modules can be mounted inside the casing 4 at high density, thereby miniaturizing the portable computer 1*d*.

Meanwhile, the present embodiment employs the W-LAN module 53 having the first face 38 on which the component 53*a* is mounted, and the second face 39 on which no component is mounted. However, as indicated by a line constituted of long and short dashes in FIG. 6, as another example, there can be employed a W-LAN module in which the component 53*b* which is smaller in height than the component 53*a* mounted on the first face is mounted on the second face. When the foot sections 37 of the connector 22 are formed so as to be long in the vertical direction, a W-LAN module on which the component 53*a* and the component 53*b* are respectively mounted on the surface and the back surface can be employed.

As a matter of course, the first module to be supported by the connector 22 is not limited to a W-LAN module, and an arbitrary PCI module connectable to a PCI bus may be employed. Furthermore, the first module is not limited to a PCI module, and may be another type of module.

In the present embodiment, a PC card slot is not disposed in the lower face of the circuit board 21. However, as a matter off course, a PC card slot may be disposed therein.

Hithertofore, the first through fourth embodiments have been described. However, as a matter of course, the invention is not limited thereto. For instance, the layout of the housing section for housing the second module and the housing space 41 for housing the controller may be reversed. Alternatively, the controller may be mounted at a position other than in the housing space 41. The slot section 31 of the connector 22 and the support sections 32 may be disposed either integrally or independently. The support sections 32 may be formed from either a metal, a resin, or a like material. In the embodiments, the insertion port 43 of the second module and the insertion port 48 of the PC card slot are disposed at an angle of 90°. Alternatively, the insertion ports 43 and 48 may be disposed so as to be open in the same direction. Furthermore, a module-housing section may be formed from the first module and the second module without mounting the PC card serving as a third module.

Moreover, the electronic apparatus of the present invention is not limited to a portable computer. The present invention can be carried out similarly even in the case of a portable information terminal (Personal Digital Assistant) not having a display unit. Also, the present invention can be embodied by a digital camera.

The invention is not limited to the foregoing embodiments but various changes and modifications of its components may be made without departing from the scope of the present invention. Also, the components disclosed in the embodiments may be assembled in any combination for embodying the present invention. For example, some of the components may be omitted from all the components disclosed in the embodiments. Further, components in different embodiments may be appropriately combined.

What is claimed is:

1. An electronic apparatus comprising:
   a casing;
   a circuit board provided in the easing;
   a connector mounted to the circuit board and detachably connecting a first module, the first module comprises (i) a first face on which a component is mounted and (ii) a second face opposite to the first face, and is adapted for coupling to the connector such that the second face faces the circuit board; and
   a first storing member being mounted to the circuit board and positioned between the first module and the circuit board when the first module is connected to the connector, the first storing member includes a first storing portion adapted to store a second module;
   wherein the connector communicates a first data to the first module, and the first storing member is capable of communicating a second data that is different from the first data to the second module.

2. The electronic apparatus according to claim 1, wherein the first storing portion is a card slot for the first storing member that is physically separate from the connector.

3. The electronic apparatus according to claim 1, wherein the first module includes the first face on which the component is mounted, and the second face on which is mounted a component that is smaller in mount height than the component mounted on the first face.

4. The electronic apparatus according to claim 3, wherein the connector is connected to a PCI bus.

5. The electronic apparatus according to claim 2, wherein the second module is a memory card.

6. The electronic apparatus according to claim 3, further comprising a controller that is mounted on the circuit board to be disposed between the first module and the circuit board when the first module is connected to the connector, and controls at least one of the first module and the second module.

7. The electronic apparatus according to claim 1, further comprising a second storing member that is mounted to a second face of the circuit board opposite to a first face of the circuit board where the first module is disposed, the second storing member includes a second storing portion to receive a removable third module.

8. The electronic apparatus according to claim 7, wherein the third module is a PC card.

9. The electronic apparatus according to claim 7, wherein the first module, the second module, and the third module are positioned so as to be vertically overlap each other when the first module is connected to the connector, the second module is connected to the first storing member, and the third module is connected to the second storing member.

10. An electronic apparatus comprising:
    a casing;
    a circuit board provided in the casing;
    a connector mounted to the circuit board and detachably connecting a first module, the first module comprises (i) a first face being a top surface with a protruding portion, and (ii) a second face opposite to the first face, and is adapted for coupling to the connector such that the second face faces the circuit board; and
    a first storing member mounted to the circuit board and positioned between the first module and the circuit board when the first module is connected to the connector, the first storing member including a first storing portion adapted to store a second module;
    wherein the connector is connected to a PCI bus and the second module is a memory card.

11. The electronic apparatus according to claim 10, wherein the protruding portion of the first face of the first module includes a component mounted onto and protruding from the first face of the first module with the second face having no component thereon.

12. The electronic apparatus according to claim 10, wherein the first module includes the first face on which a component is mounted to produce the protruding portion, and the second face on which is mounted a component that is smaller in mount height than the component mounted on the first face.

13. The electronic apparatus according to claim 10, further comprising a controller that is mounted on the circuit board to be disposed between the first module and the circuit board when the first module is connected to the connector, and controls at least one of the first module and the second module.

14. The electronic apparatus according to claim 10, further comprising a second storing member that is mounted to a second face of the circuit board opposite to a first face of the circuit board where the first module is disposed, wherein the second storing member detachably connected to a third module.

15. The electronic apparatus according to claim 14, wherein the third module is a PC card.

16. The electronic apparatus according to claim 14, wherein the first module, the second module, and the third module are positioned so as to be vertically overlap each other when the first module is connected to the connector, the second module is connected to the first storing member, and the third module is connected to the second storing member.

17. The electronic apparatus according to claim 1, wherein the first module is a wireless local area network (W-LAN) module, the first storing portion is a memory card slot and the second module is a memory card.

18. The electronic apparatus according to claim 1, wherein the first module vertically overlaps the second module so that a footprint on the circuit board occupied by the first module and the second module is equal in size to a footprint on the circuit board occupied only by the first module.

19. The electronic apparatus according to claim 18, wherein the first storing portion is a memory card slot and the second module is a memory card.

20. The electronic apparatus according to claim 10, wherein the connector is positioned so that the first module is situated above the first storing member when the first module is coupled to the connector, the first storing member including a card slot and physically separate from the connector.

* * * * *